(12) United States Patent
Sasaki et al.

(10) Patent No.: US 11,307,031 B2
(45) Date of Patent: Apr. 19, 2022

(54) SURVEYING DEVICE, AND CALIBRATION CHECKING METHOD AND CALIBRATION CHECKING PROGRAM FOR SURVEYING DEVICE

(71) Applicant: TOPCON CORPORATION, Tokyo (JP)

(72) Inventors: You Sasaki, Tokyo (JP); Yasushi Tanaka, Tokyo (JP); Nobuyuki Nishita, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 773 days.

(21) Appl. No.: 16/168,924

(22) Filed: Oct. 24, 2018

(65) Prior Publication Data
US 2019/0145769 A1    May 16, 2019

(30) Foreign Application Priority Data

Nov. 13, 2017   (JP) .............................. JP2017-218353

(51) Int. Cl.
*G01S 17/10*   (2020.01)
*G01S 17/89*   (2020.01)
(Continued)

(52) U.S. Cl.
CPC ............. *G01C 15/004* (2013.01); *G01C 1/02* (2013.01); *G01C 3/08* (2013.01); *G01C 15/002* (2013.01);
(Continued)

(58) Field of Classification Search
CPC ...... G01C 15/004; G01C 15/002; G01C 3/08; G01C 1/02; G02B 23/105; G01S 17/10;
(Continued)

(56) References Cited

U.S. PATENT DOCUMENTS 7,861,423 B2   1/2011  Kumagai et al.
8,767,190 B2   7/2014  Hall
(Continued)

FOREIGN PATENT DOCUMENTS

EP        3258212 A1    12/2017
JP     2008-268004 A    11/2008
(Continued)

OTHER PUBLICATIONS

Extended Search Report dated Mar. 26, 2019, in connection with European Patent Application No. 18199116.7, 11 pgs.
(Continued)

*Primary Examiner* — Daniel L Murphy
(74) *Attorney, Agent, or Firm* — Chiesa Shahinian & Giantomasi PC

(57) ABSTRACT

A technique is provided to enable check of a calibrated condition of a total station (TS) having a laser scanner in a surveying site. The TS includes an optical system for sighting an object, a laser positioning part that irradiates the object with laser light via the optical system to position the object, and a plane crossing location identifying part that identifies a crossing location of multiple planes constituting a three-dimensional structure as a first location, on the basis of the positioning result from the laser positioning part. The TS also includes a laser scanner that performs laser scanning in an area containing the crossing location, a plane crossing location calculator that calculates the crossing location as a second location on the basis of laser scanning data from the laser scanner, and a comparing part that compares the first location and the second location with each other.

6 Claims, 6 Drawing Sheets

(51) Int. Cl.
*G01S 7/48* (2006.01)
*G01C 15/00* (2006.01)
*G02B 23/10* (2006.01)
*G01S 7/51* (2006.01)
*G01S 7/481* (2006.01)
*G01S 17/87* (2020.01)
*G01C 3/08* (2006.01)
*G01S 7/497* (2006.01)
*G01C 1/02* (2006.01)
*G01S 17/42* (2006.01)

(52) U.S. Cl.
CPC .......... *G01S 7/4808* (2013.01); *G01S 7/4817* (2013.01); *G01S 7/4972* (2013.01); *G01S 7/51* (2013.01); *G01S 17/10* (2013.01); *G01S 17/42* (2013.01); *G01S 17/87* (2013.01); *G01S 17/89* (2013.01); *G02B 23/105* (2013.01)

(58) Field of Classification Search
CPC ........ G01S 7/51; G01S 7/4808; G01S 7/4817; G01S 17/89; G01S 17/87; G01S 7/4972; G01S 17/42
USPC ........................................................ 356/4.01
See application file for complete search history.

(56) References Cited

U.S. PATENT DOCUMENTS

| | | |
|---|---|---|
| 2009/0235541 A1 | 9/2009 | Kumagai et al. |
| 2009/0241358 A1 | 10/2009 | Ohtomo et al. |
| 2010/0256940 A1 | 10/2010 | Ogawa et al. |
| 2012/0242830 A1 | 9/2012 | Kumagai et al. |
| 2015/0042977 A1 | 2/2015 | Siercks et al. |
| 2015/0293224 A1 | 10/2015 | Eldada et al. |

FOREIGN PATENT DOCUMENTS

| | | |
|---|---|---|
| JP | 2009-229192 A | 10/2009 |
| JP | 2010-151682 A | 7/2010 |
| JP | 2012-202821 A | 10/2012 |
| JP | 5124319 B2 | 1/2013 |
| JP | 2017-026551 A | 2/2017 |

OTHER PUBLICATIONS

Notice of Reasons for Refusal dated Oct. 25, 2021, in connection with Japanese Patent Application No. 2017-218353, 4 pgs (including translation).

SURVEYING DEVICE, AND CALIBRATION CHECKING METHOD AND CALIBRATION CHECKING PROGRAM FOR SURVEYING DEVICE

CROSS-REFERENCE TO RELATED APPLICATION

This application is based upon and claims benefit of priority from Japanese Patent Application No. 2017-218353, filed Nov. 13, 2017, the entire contents of which are incorporated herein by reference

BACKGROUND OF THE INVENTION

The present invention relates to a technique for calibration of a surveying device.

A total station (TS) is publicly known as a surveying device. Such TS is disclosed in, for example, Japanese Unexamined Patent Applications Laid-Open Nos. 2009-229192 and 2012-202821.

The TS has a laser distance measuring function, which is known as being useable to make the TS being also used as a laser scanner. This laser scanner performs laser scanning in laser distance measurement with respect to each point, while an optical system of the TS moves vertically and laterally. This method is simple and easy, but is inferior to a dedicated laser scanner in scanning speed and scanning resolution. The dedicated laser scanner also operates based on the laser distance measurement, but has a positioning accuracy falling short of that of a laser positioning function of a TS. This is due to high speed scanning of the dedicated laser scanner, and a timing of measuring a distance by using laser distance measuring light differs from a timing of measuring an emitting direction of the laser distance measuring light, which generates a measurement error and decreases positioning accuracy. In view of this, in order to obtain advantages of both the TS and the dedicated laser scanner, a highly accurate laser distance measuring unit of the TS and the function to make the TS being used as the laser scanner are separated as independent units and are combined together.

In this condition, the position of optical origin of the highly accurate laser distance measuring unit is physically separated from the position of optical origin of a unit having the separated function for the laser scanner. The separated amount is preliminarily set as an offset value at the time of designing in order to enable correction of positioning data, but this is not sufficient, and calibration is required after the product is completed. Normally, calibration is performed at the time product is shipped. The calibration can also be performed as a service of a manufacturer or a maintenance company after sale. However, the calibration requires a dedicated apparatus and complicated procedure.

The calibration described above is normally performed in presupposed specific circumstances, and therefore, the calibrated condition may not be appropriate in actual surveying circumstances. Moreover, the calibrated condition can change over time.

SUMMARY

In view of these circumstances, an object of the present invention is to provide a technique that enables check of a calibrated condition of a TS having a laser scanner at a surveying site or at other sites.

An aspect of the present invention provides a surveying device including an optical system, a laser positioning part, a plane crossing location identifying part, a laser scanner, a plane crossing location calculator, and a comparing part. The optical system is used to sight an object to be positioned. The laser positioning part irradiates the object with laser light via the optical system to position the object. The plane crossing location identifying part identifies a crossing location of multiple planes constituting a three-dimensional structure as a first location, on the basis of a result of the positioning performed by the laser positioning part. The laser scanner performs laser scanning in an area containing the crossing location of the planes of the three-dimensional structure. The plane crossing location calculator calculates the crossing location of the planes of the three-dimensional structure as a second location, on the basis of resultant data of the laser scanning performed by the laser scanner. The comparing part compares the first location and the second location with each other.

In the present invention, the surveying device may further include a judging part that judges a calibrated condition between the laser positioning part and the laser scanner on the basis of information whether the difference between the first location and the second location is in a predetermined threshold range.

In the present invention, the plane crossing location identifying part may identify the crossing location of the multiple planes on the basis of positioning data of multiple points in each of the multiple planes. These positioning data are obtained by the laser positioning part.

Another aspect of the present invention provides a calibration checking method for a surveying device having a laser positioning part combined with a laser scanner. The method includes identifying a crossing location of multiple planes constituting a three-dimensional structure, on the basis of a result of positioning performed by the laser positioning part, and calculating the crossing location of the planes of the three-dimensional structure on the basis of laser scanning data obtained by the laser scanner. This method also includes comparing the identified crossing location of the multiple planes and the calculated crossing location of the multiple planes with each other.

Yet another aspect of the present invention provides a non-transitory computer recording medium storing computer executable instructions for checking a calibrated condition between a laser positioning part and a laser scanner. The laser positioning part and the laser scanner are equipped in combination on a surveying device. The computer executable instructions, when executed by a computer processor, cause the computer processor to identify a crossing location of multiple planes constituting a three-dimensional structure, on the basis of a result of positioning performed by the laser positioning part, calculate the crossing location of the planes of the three-dimensional structure on the basis of laser scanning data obtained by the laser scanner, and compare the identified crossing location of the multiple planes and the calculated crossing location of the multiple planes with each other.

Yet another aspect of the present invention provides a surveying device including a sighting part, a positioning part, a laser scanner, an identifying part, a calculator, and a comparing part. The sighting part sights an object to be positioned. The positioning part positions the sighted object. The identifying part identifies a crossing location of multiple planes constituting a three-dimensional structure on the basis of a result of positioning performed by the positioning part. The calculator calculates the crossing location of the planes of the three-dimensional structure on the basis of laser scanning data obtained by the laser scanner. The comparing part compares the identified crossing location of the multiple planes and the calculated crossing location of the multiple planes with each other.

Yet another aspect of the present invention provides a calibration checking method for a surveying device. This surveying device includes a sighting part that sights an object to be positioned, a positioning part that positions the sighted object, and a laser scanner. This method includes identifying a crossing location of multiple planes constituting a three-dimensional structure by the positioning part, calculating the crossing location of the planes of the three-dimensional structure on the basis of laser scanning data obtained by the laser scanner, and comparing the identified crossing location of the multiple planes and the calculated crossing location of the multiple planes with each other.

The present invention provides a technique that enables check of a calibrated condition of a TS having a laser scanner in a surveying site or in other sites.

DETAILED DESCRIPTION

1. First Embodiment

Outline

Figure 1:
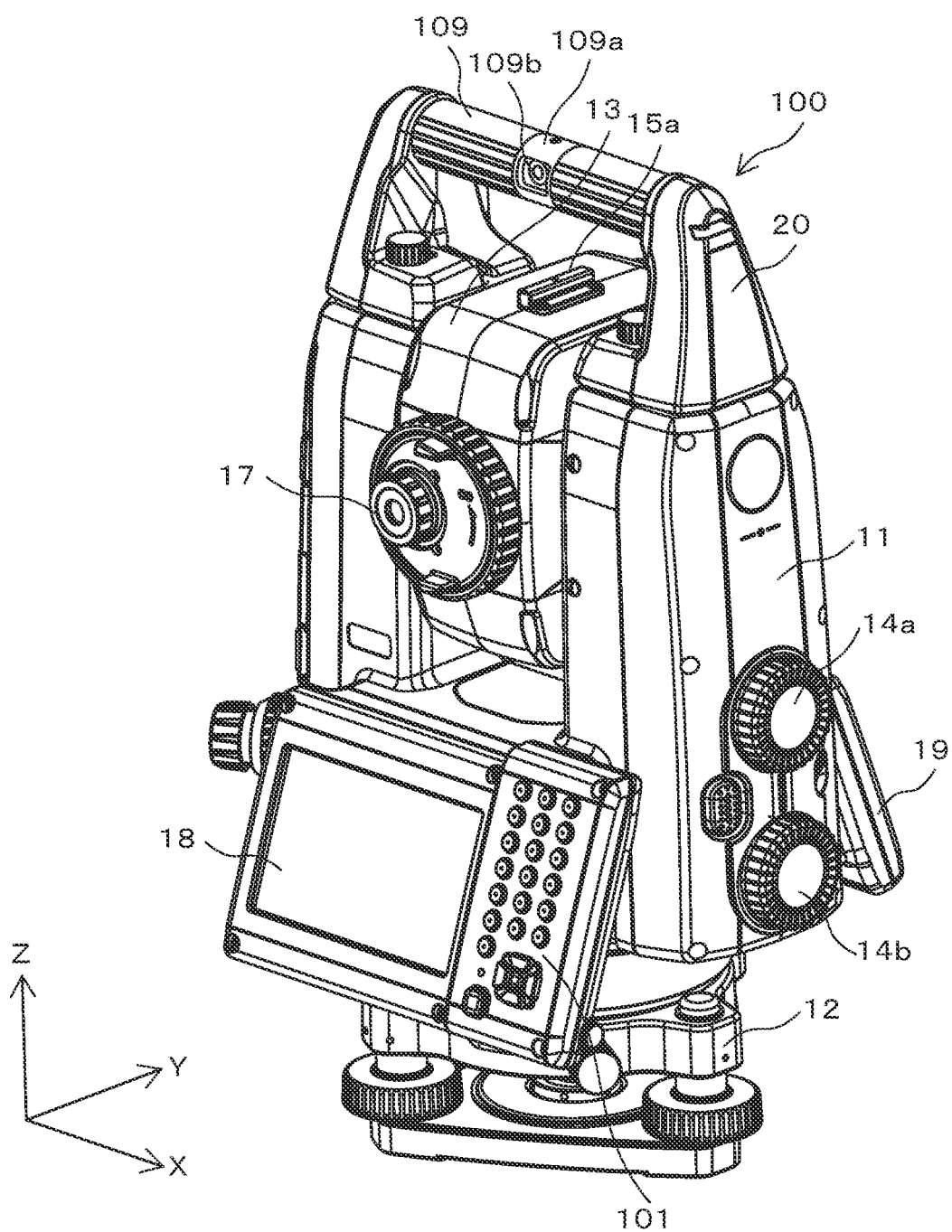
FIG. 1 is a perspective view of a total station (TS) using the present invention.
Figure 2:
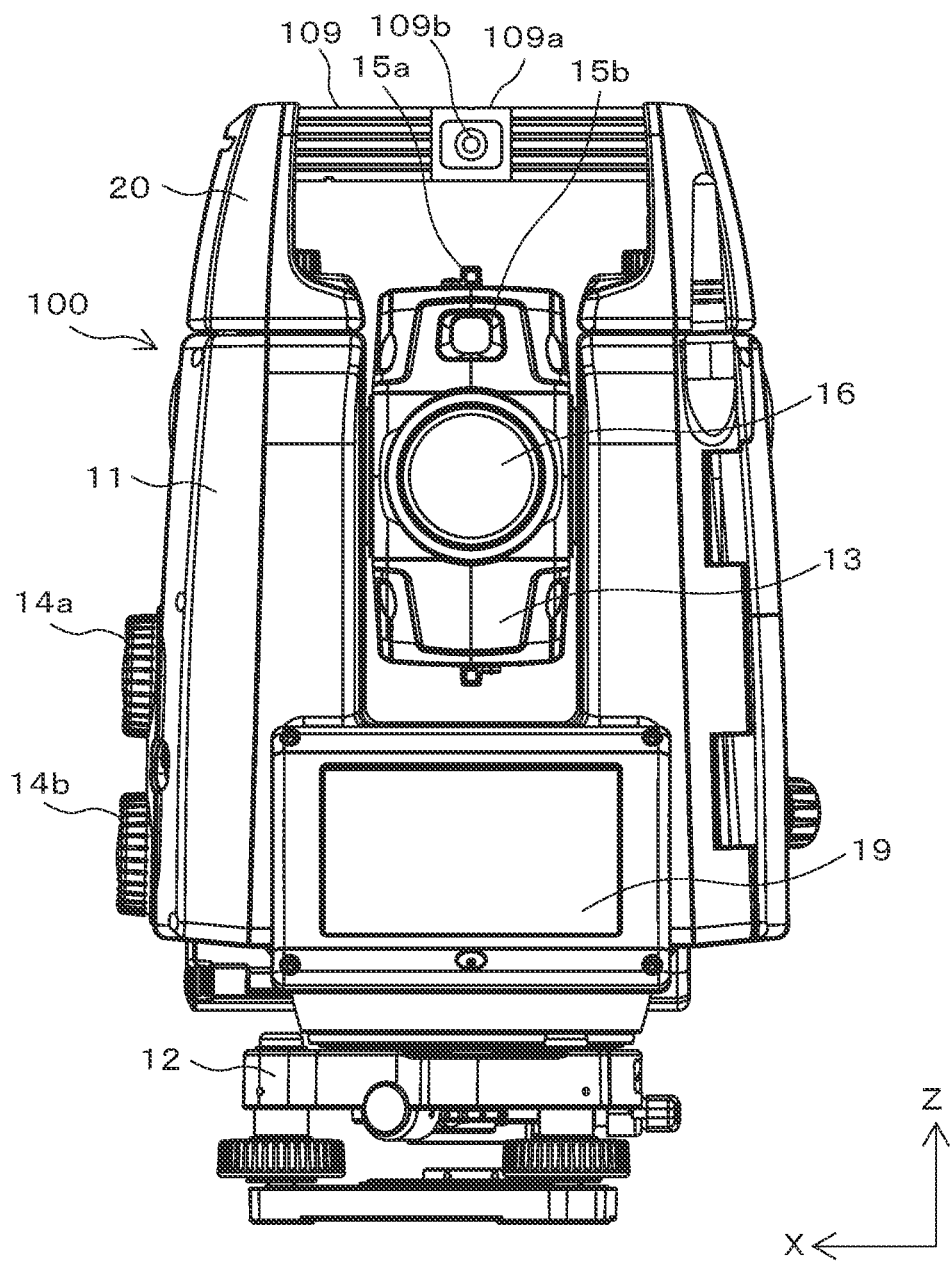
FIG. 2 is a front view of the TS using the present invention.

FIG. 1 shows a perspective view of a total station (TS) 100 having a laser scanner, which uses the present invention. FIG. 2 shows a front view of the TS 100. The TS 100 has the same functions as those of an ordinary TS, except that the TS 100 has a laser scanner 109 and has a function of performing a process relating to calibration of each of a laser positioning part 200 and the laser scanner 109. The laser scanner 109 is described later. A detailed structure of the TS is disclosed in Japanese Unexamined Patent Applications Laid-Open Nos. 2009-229192 and 2012-202821, for example.

The TS 100 has a main unit 11 that is held in a horizontally rotatable manner by a base 12. The base 12 may be fixed on a top of a tripod (not shown). The main unit 11 has an approximately U-shape with two extending parts that extend upwardly as viewed from a Y-axis direction. The main unit 11 also has a movable part 13 that is held between the two extending parts so as to be controllable in a vertical angle composed of an elevation angle and a depression angle.

The horizontal rotation angle of the main unit 11 relative to the base 12 is controlled by a motor. The vertical angle of the movable part 13 is also controlled by a motor. Driving to control the horizontal rotation angle and the vertical angle is performed by a vertical and horizontal rotation driving unit 106 incorporated in the main unit 11. The vertical and horizontal rotation driving unit 106 is shown in the block diagram in FIG. 3.

The main unit 11 has a horizontal rotation angle controlling dial 14a and a vertical angle controlling dial 14b arranged thereon. The horizontal rotation angle controlling dial 14a is operated to adjust the horizontal rotation angle of the main unit and the movable part 13, and the vertical angle controlling dial 14b is operated to adjust the vertical angle of the movable part 13.

The movable part 13 has a rectangular cylindrical sighting unit 15a for approximate sighting, arranged on a top thereof. The movable part 13 also has an optical sighting unit 15b with a visual field narrower than that of the sighting unit 15a and has a telescope 16 that can be collimated at a high accuracy.

An image captured by the sighting unit 15b and the telescope 16 can be visually recognized by looking into an eyepiece 17. The telescope 16 also serves as an optical system for distance measuring laser light and for tracking light that is used to track and capture an object of which a distance is to be measured. An example of the object includes a target made of a dedicated reflective prism. The distance measuring laser light is abbreviated as "distance measuring light". The optical system is designed so that the optical axes of the distance measuring light and the tracking light will coincide with the optical axis of the telescope 16. The structure of this part is the same as that of a commercially available TS.

The main unit 11 has displays 18 and 19 attached thereto. The display 18 is integrated with a controller 101. The controller 101 has a numeric keypad, a cross operation button, and other operation parts arranged thereon, by which various operations relating to the TS 100 and data input are performed. The displays 18 and 19 display various pieces of information necessary to operate the TS 100, surveying data, and other information. These two displays are mounted in order to enable watching a display from either the front side or the back side without having to rotate the main unit 11.

The main unit 11 has a laser scanner holder 20 that is fixed at a top of the main unit 11 and that is constituted of a pair of members. The pair of the members constituting the laser scanner holder 20 has a laser scanner 109 fixed therebetween. The laser scanner 109 has an approximately cylindrical structure and has a rotating part 109a that rotates around an X-axis. The rotating part 109a is provided with an optical window 109b. The rotating part 109a encloses multiple light emitting parts and light receiving parts at an inner side of the optical window 109b, and multiple pulsed beams of laser scanning light are emitted from the optical window 109b to the outside while the rotating part 109a rotates.

The multiple pulsed beams of the laser scanning light are intermittently emitted from the optical window 109b in a fan shape with an expansion angle of approximately 20 to 45 degrees along an extending direction of the rotation axis of the rotating part 109a. At this time, the laser scanning light is emitted while the rotating part 109a rotates. Thus, laser scanning light with a width of some degree in the extending direction of the rotation axis of the rotating part 109a is emitted from the laser scanner 109 while scanning around the X-axis. In the meantime, the laser scanning light is emitted while the main unit 11 is horizontally rotated around a Z-axis. As a result, the entirety of the surroundings or a necessary area is subjected to the laser scanning.

The laser scanner 109 can use a commercially available unit. The technique relating to the laser scanner is disclosed in Japanese Unexamined Patent Applications Laid-Open Nos. 2010-151682 and 2008-268004 and U.S. Pat. No. 8,767,190, for example. The laser scanner can be one that electronically performs scanning, as disclosed in U.S. Patent Application Publication No. 2015/0293224.

Block Diagram

Figure 3:
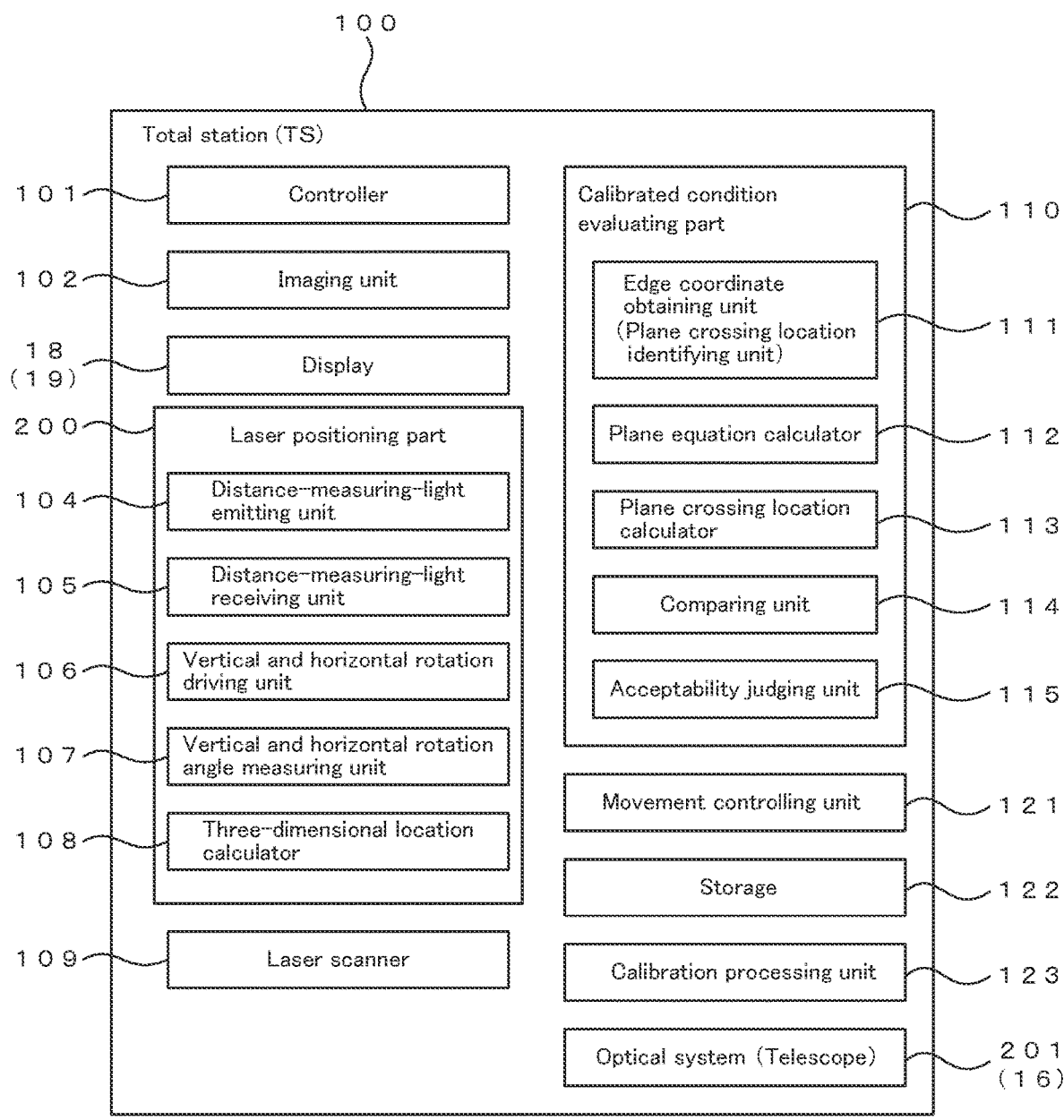
FIG. 3 is a block diagram of the TS using the present invention.

FIG. 3 shows a block diagram of the TS 100. The basic functions of the TS 100 as a total station are the same as those of an existing total station. The TS 100 differs from an existing total station in that the TS 100 is combined with an independent laser scanner 109 and in that the TS 100 has a function of evaluating a calibrated condition between the combined laser scanner 109 and the positioning function of the TS 100 performed by the laser positioning part 200.

The TS 100 includes a controller 101, an imaging unit 102, displays 18 and 19, a laser positioning part 200, a laser scanner 109, a calibrated condition evaluating part 110, a movement controlling unit 121, a storage 122, a calibration processing unit 123, and an optical system 201.

The laser positioning part 200 performs positioning that is a function originally provided to a TS. The laser positioning part 200 includes a distance-measuring-light emitting unit 104, a distance-measuring-light receiving unit 105, a vertical and horizontal rotation angle driving unit 106, a vertical and horizontal rotation angle measuring unit 107, and a three-dimensional location calculator 108. The optical system 201 includes a sighting unit 15b (refer to FIG. 2), a telescope 16 (refer to FIG. 2), an optical system of the laser positioning part 200, an optical system of the imaging unit 102, and an optical system containing a light path of tracking light (not shown).

The optical system 201 is calibrated in the same manner as in an ordinary TS having an optical system with configuration similar to that of the optical system 201. The optical system 201 includes various types of lenses, a mirror, a dichroic mirror for separating and combining light paths, a half-mirror, a polarizing mirror, or other parts. With use of the optical system 201, the distance measuring laser light emitted from the distance-measuring-light emitting unit 104 passes through the telescope 16 and reaches an object to be positioned, and the distance measuring laser light is reflected back from the object through the telescope 16 and is received by the distance-measuring-light receiving unit 105. The optical system 201 conducts an image captured by the telescope 16 to the eyepiece 17 and to the imaging unit 102.

The TS 100 also includes a tracking light emitting unit, a tracking light receiving unit, and a track controlling unit. The tracking light emitting unit emits tracking light for tracking a target such as a reflective prism. The tracking light receiving unit receives the tracking light that is reflected back from the target. The track controlling unit outputs a control signal to the vertical and horizontal rotation driving unit 106 so that the tracking light will be caught at a collimation position in a visual field of the telescope 16. These structures are the same as those of an existing commercially available product, and therefore, unnecessary descriptions thereof are not given. The structure relating to the tracking light of the TS is disclosed in, for example, Japanese Patent No. 5124319.

The controller 101 receives contents of operation of the TS 100 input by an operator. The TS 100 is operated through a button switch or other operation parts of the TS 100. A tablet or a smartphone can also be used as a controller. In this case, dedicated application software may be installed in a tablet or a smartphone to make the tablet or the smartphone function as a control unit of the TS 100.

The imaging unit 102 images an image captured by the telescope 16. The imaging is performed by, for example, a CCD imaging sensor or a CMOS imaging sensor. The displays 18 and 19 display images imaged by the imaging unit 102, information necessary to operate the TS 100, and information relating to movement of the TS 100 such as distance measuring data and direction of a target. Each of the displays 18 and 19 may use a liquid crystal display, an electroluminescent (EL) display, or other display. The displays 18 and 19 also display a 3D image formed of point cloud data obtained by the laser scanner 109. The 3D display of the point cloud data is disclosed in, for example, Japanese Patent Application No. 2016-173468.

The distance-measuring-light emitting unit 104 emits distance measuring laser light (distance measuring light). The distance measuring laser light passes through the telescope 16 in the same axis direction as the optical axis of the telescope 16. The distance-measuring-light receiving unit 105 receives the distance measuring light reflected back from an object, such as a reflective prism, through the telescope 16. The distance-measuring-light receiving unit 105 uses an optical measuring device such as a photodiode.

The optical axis of the distance measuring light, which is emitted from the distance-measuring-light emitting unit 104, and the optical axis of the distance measuring light, which is reflected back from the object to the TS 100 and enters the distance-measuring-light receiving unit 104, are combined by using the optical system, such as the dichroic mirror, the half-mirror, and the polarizing mirror.

The vertical and horizontal rotation driving unit 106 drives to horizontally rotate the main unit 11 and to vertically rotate the movable part 13. The vertical and horizontal rotation driving unit 106 includes a motor, a gear mechanism, and a driving circuit for performing these drivings.

The vertical and horizontal rotation angle measuring unit 107 measures a horizontal rotation angle of the main unit 11 and a vertical angle of the movable part 13 in terms of an elevation angle and a depression angle. The horizontal rotation angle is measured, for example, in a clockwise direction starting from the direction of north as 0 degrees as viewed downwardly. The elevation angle is measured on the condition that an elevation direction starting from the horizontal direction as 0 degrees is a positive angle, and the depression angle is measured on the condition that a depression direction starting from the horizontal direction as 0 degrees is a negative angle.

The three-dimensional location calculator 108 calculates values of three-dimensional coordinates of an object from a distance to the object and an emitting direction of the distance measuring light. The object is a target of which the distance is to be measured, such as a reflection point of a reflective prism that reflects the distance measuring light. The distance is calculated on the basis of a time-of-flight of the distance measuring light from the distance-measuring-light emitting unit 104. The three-dimensional coordinates of the object of which the distance is to be measured is obtained in terms of values in a coordinate system having the origin at the TS 100, which is described as a "TS coordinate system" hereinafter.

Normally, the TS 100 is installed at a location of which coordinates in an absolute coordinate system are known, and therefore, coordinates of location data obtained in the TS coordinate system can be converted into coordinates of the absolute coordinate system by performing parallel movement and rotation as necessary. The absolute coordinate system is a global coordinate system fixed relative to the ground. For example, a GNSS normally uses an absolute coordinate system. Typically, a map is described in the absolute coordinate system. The absolute coordinate system uses, for example, longitude, latitude, and elevation above mean sea level for specifying a location.

The distance from the TS 100 to the object of which a distance is to be measured is calculated as follows. The TS 100 incorporates a reference light path with a known light path length that conducts light emitted from the distance-measuring-light emitting unit 104. The light from the distance-measuring-light emitting unit 104 is divided into two beams, and one beam advances from the telescope 16 through a light path connecting the telescope 16, a positioning point, the telescope 16, and the distance-measuring-light receiving unit 105, in this order, whereas the other beam advances from the reference light path to the distance-measuring-light receiving unit 105. The distance measuring light is pulsed light, and therefore, the one beam of the distance measuring light advancing through the light path and the other beam of the distance measuring light advancing through the other light path are received at different timings by the distance-measuring-light receiving unit 105. This generates a phase difference between waveforms that are measured by the distance-measuring-light receiving unit 105. The phase difference is used to calculate the distance to the reflection point.

Meanwhile, the direction of the reflection point that reflects the distance measuring light, as viewed from the TS 100, is obtained in terms of angle by the vertical and horizontal rotation angle measuring unit 107. The distance and direction determined provides a three-dimensional location of the reflection point that reflects the distance measuring light. The three-dimensional location is represented by using the TS 100 as reference or the origin. This process is performed by the three-dimensional location calculator 108. Thus, the laser positioning part 200 measures the location of the positioning point.

The laser scanner 109 obtains point cloud data by performing laser scanning. The range of the laser scanning can be set as desired.

The calibrated condition evaluating part 110 checks the effectiveness of calibration data or a calibration formula for compensating a difference between the positioning point and a laser scanning point. The positioning point is a point positioned by the laser positioning part 200 through the calculation by the three-dimensional location calculator 108. The laser scanning point is a point subjected to the laser scanning performed by the laser scanner 109. The calibration data or the calibration formula is obtained in a calibration process that is performed by a manufacturer or a sales company of the TS 100, in advance.

The calibration process optimizes correction value and correction formula for correcting a measurement value, and the optimized correction value and correction formula are used to correct one or both of a resultant value of the positioning performed by the laser positioning part 200 and a value of the point cloud data obtained by the laser scanner 109. However, this preparatory calibration process is performed in a specific circumstance, and therefore, an optimal calibrating condition can change depending on the circumstances. Moreover, an optimal correcting condition can also change with lapse of time. The calibrated condition evaluating part 110 evaluates the acceptableness of the calibrated condition by the following method.

The following describes details of the calibrated condition evaluating part 110 and processes performed thereby. The calibrated condition checking process uses a three-dimensional structure having at least one of an apex and a rim or side. The calibrated condition evaluating part 110 includes an edge coordinate obtaining unit 111, a plane equation calculator 112, a plane crossing location calculator 113, a comparing unit 114, and an acceptability judging unit 115.

The edge coordinate obtaining unit 111 obtains a location of an edge of the three-dimensional structure. The edge coordinate obtaining unit 111 is an example of a plane crossing location identifying unit. The three-dimensional structure uses an artificial structure, such as a building, or a cubic target prepared as a target. The three-dimensional structure can also use a natural object.

The edge includes an apex and a rim of the three-dimensional structure in this embodiment. That is, an apex and a rim or outline are included at a location at which planes cross each other. The apex is defined as a part at which at least three planes cross each other. The rim is defined as existing at a linearly crossing location of two planes that cross each other. The location of the apex is obtained by collimating the telescope 16 of the TS 100 and then positioning that is performed by the laser positioning part 200. The location of the rim is obtained as follows: the telescope 16 of the TS 100 is collimated for multiple points on the rim, the multiple points are positioned by the laser positioning part 200, and a straight line equation that fits to the multiple positioning points is calculated.

Figure 4:
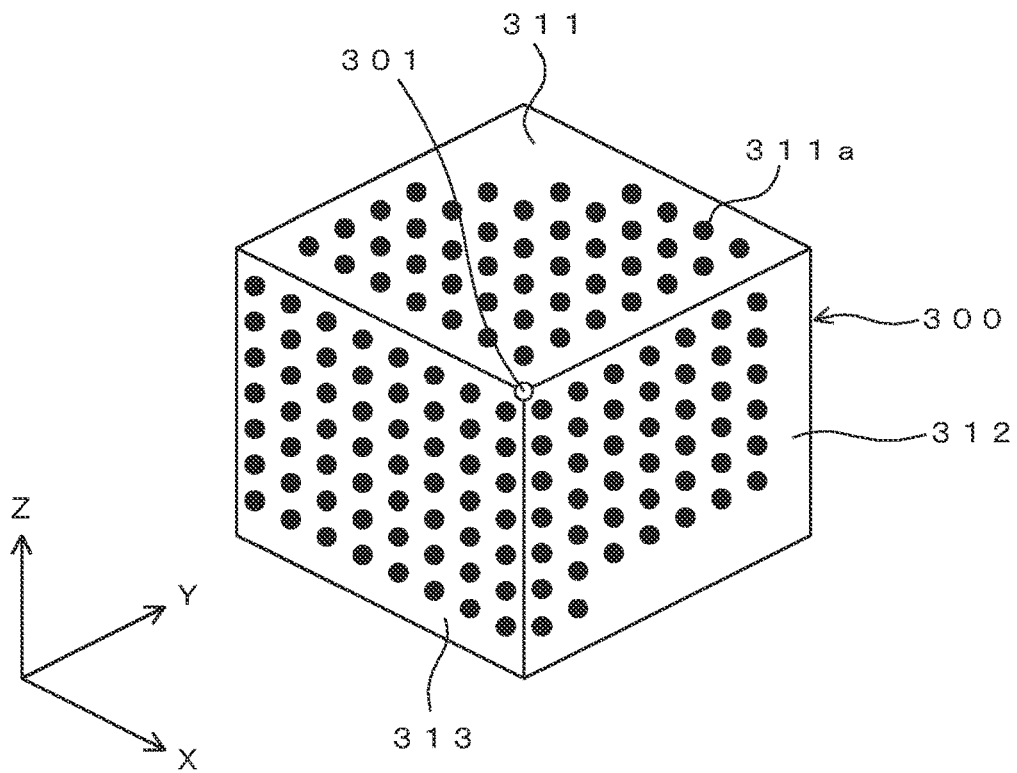
FIG. 4 is a conceptual diagram of a three-dimensional structure used in a calibration process.
Figure 5:
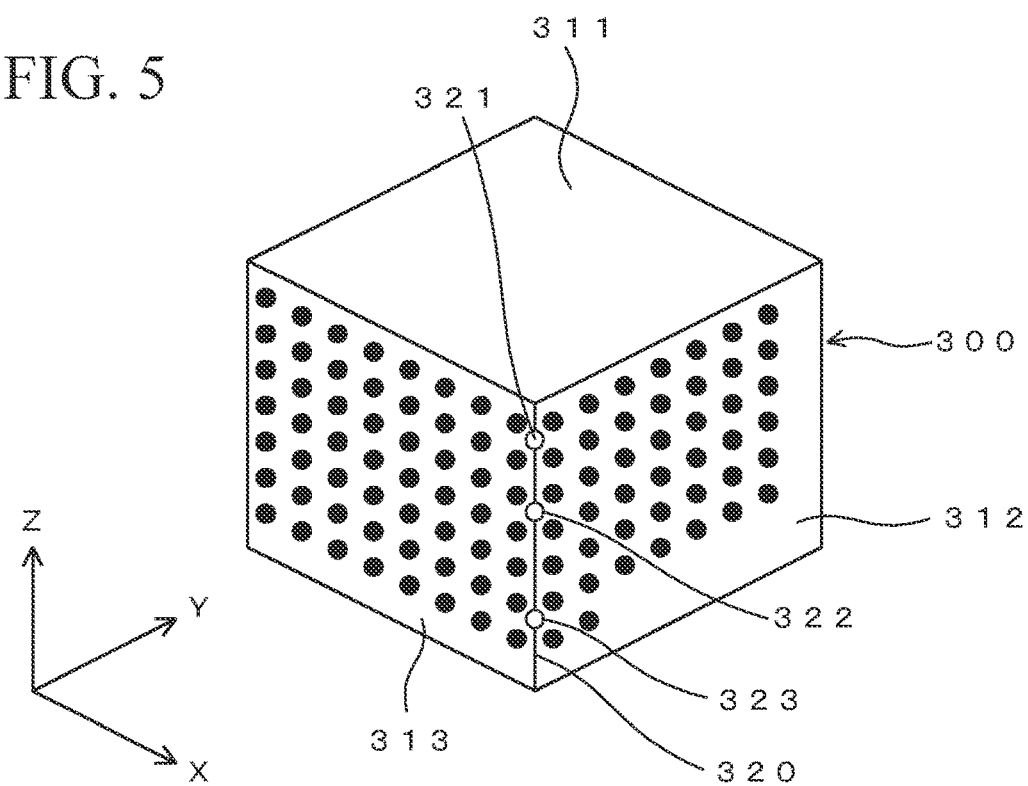
FIG. 5 is a conceptual diagram of the three-dimensional structure used in the calibration process.

FIGS. 4 and 5 show a cube 300. The coordinate system in FIGS. 4 and 5 is a linear orthogonal coordinate system of a TS coordinate system having the origin at the TS 100, an X-axis positive direction in the direction of east, a Y-axis positive direction in the direction of north, and a Z-axis positive direction in the direction of vertical upward. Of course, this coordinate system can also use an absolute coordinate system.

FIGS. 4 and 5 show three planes 311, 312, and 313 orthogonally crossing each other to construct the cube 300. FIG. 4 also shows an apex 301 with a white circle mark, at which the three planes cross each other. The planes 311, 312, and 313 are flat planes here, but they may be curved planes that can be easily modeled and be easily processed in a mathematical manner. In the case in FIG. 4, the telescope 16 is collimated for the apex 301, and the apex 301 is positioned by the laser positioning part 200. The coordinates of the apex 301 positioned by the laser positioning part 200 are obtained by the edge coordinate obtaining unit 111.

In the case of using a rim, the telescope 16 is collimated for the rim or side of the cube, two or more points on the rim or side are positioned by the laser positioning part 200, and a straight line equation that fits to the two or more positioning points is calculated. The resultant straight line determines the location of the rim or side. This process is performed by the edge coordinate obtaining unit 111.

FIG. 5 shows a rim 320 at which the planes 312 and 313 of the cube 300 cross each other. FIG. 5 also shows three points 321, 322, and 323 with white circle marks on the rim 320. In this case, the telescope 16 is collimated for the three points 321, 322, and 323, and the three points 321, 322, and 323 are positioned by the laser positioning part 200. Thereafter, a straight line that fits to the three points 321, 322, and 323 is calculated as the rim 320.

The plane equation calculator 112 calculates an equation of a plane to which laser scanning point cloud fits. The laser scanning point cloud is point cloud data obtained by the laser scanner 109. In a case of targeting a wide area, obtained point clouds also contain a point cloud of a part that is not a plane, and therefore, multiple points constituting a plane are extracted from a predetermined number of point clouds or from point clouds in a predetermined area, and a plane equation is obtained by using these extracted points.

For example, in the case in FIG. 4, a plane that fits to a laser scanning point cloud 311a composed of points distributed on a plane, and a plane equation is obtained by using this plane as a plane 311. This plane equation is data representing the plane 311 captured by the laser scanner 109. Similarly, plane equations of the planes 312 and 313 are obtained from the laser scanning data obtained by the laser scanner 109.

The plane crossing location calculator 113 calculates a crossing location of multiple planes that are calculated by the plane equation calculator 112. The crossing location of the planes 311, 312, and 313 in FIG. 4 is at the apex 301. In this case, the coordinates of the apex 301 are calculated as the coordinates of the crossing location of the planes 311, 312, and 313. Depending on the three-dimensional structure of the object, four or more planes may cross each other, as in a case of an apex of a quadrangular pyramid, for example.

For another example, the crossing location of the planes 312 and 313 in FIG. 5 is at the linear rim 320. The crossing location of the planes 312 and 313 is calculated by using a straight line equation that mathematically describes the rim 320.

The comparing unit 114 compares first data of the location of the edge that is positioned by the laser positioning part 200 and second data of the location of the edge that is calculated on the basis of the laser scanning point clouds obtained by the laser scanner 109. The edge is an apex or a rim or both. If the calibrated condition is still at a satisfactory degree, the difference between the first data and the second data is an acceptable value or less. If there is a calibration error, the first data and the second data have a difference therebetween accordingly. The comparing unit 114 provides information relating to this difference.

The acceptability judging unit 115 judges the acceptableness of the result of the comparison of the first data and the second data performed by the comparing unit 114. In this embodiment, a threshold value is preliminarily set, and the calibrated condition is judged as being acceptable if the difference between the first data and the second data is the threshold value or less. Otherwise, if the difference between the first data and the second data exceeds the threshold value, the calibrated condition is judged as being unacceptable. The threshold value for the judgment depends on a necessary surveying accuracy. A value that is experimentally calculated in advance may be used as the threshold value. In one example, multiple threshold values for the judgment may be prepared, and one of them may be selected and used depending on a necessary accuracy.

The movement controlling unit 121 controls movement of the TS 100. The movement controlling unit 121 also performs controlling relating to the processing in FIG. 6, which is described later. The storage 122 stores data necessary to operate the TS 100, an operation program, surveying result, and other information.

If the acceptability judging unit 115 judges the calibrated condition as being unacceptable, the calibration processing unit 123 performs a calibration process to correct the difference between the positioning function performed by the laser positioning part 200 of the TS 100 and the laser scanner 109. The following describes an example of the calibration process using the apex 301 in FIG. 4. First, the apex 301 is positioned by using the laser positioning part 200 to obtain first location data of the apex 301. On the other hand, the planes 311, 312, and 313 are identified by the laser scanning performed by the laser scanner 109, and a location of the apex 301 at which the three planes cross each other is calculated to obtain second location data of the apex 301.

The calibration processing unit 123 performs the calibration process on the basis of the difference between the first location data and the second location data of the apex 301. At the time of designing, a difference in location of the optical origin between the laser positioning part 200 and the laser scanner 109 is set as an offset value, and this offset value is optimized in a preparatory calibration process prior to product shipment. This offset value is used to correct and calculate the measurement value so that the difference between the first location data and the second location data will be an acceptable value or less.

The preparatory calibration optimizes the offset value so that a difference between first location data and second location data measured at the same point will be a threshold value or less by correcting one or both of the first location data and the second location data on the basis of the optimized offset value.

However, various kinds of causes may deviate the offset value from an optimal value, and the offset value cannot compensate for the difference between the first location data and the second location data to an acceptable degree in some cases. In these cases in which the difference between the first location data and the second location data exceeds a threshold value and is unacceptable, the present offset value is corrected again. This process is performed by the calibration processing unit 123.

For example, in the condition in which the first location data is represented as (X1, Y1, Z1), and the second location data is represented as (X2, Y2, Z2), X1−X2=ΔX, Y1−Y2=ΔY, and Z1−Z2=ΔZ. In the case in which the values (ΔX, ΔY, ΔZ) are not acceptable, the offset value is corrected so that the values (ΔX, ΔY, ΔZ) will be acceptable values or less.

For example, offset values representing a difference in location of the optical origin between the laser positioning part 200 and the laser scanner 109 are represented as (δLx, δLx, δLx). In this case, at least one of the positioning data from the laser positioning part 200 and the point cloud data from the laser scanner 109 is obtained or corrected or adjusted through calculation considering the offset value so that the measurement error due to the difference in location of the optical origin will be an acceptable value or less. A process for setting for this adjustment is the preparatory calibration process.

In the case in which the values (ΔX, ΔY, ΔZ) do not have acceptable values or less, the values (δLx, δLx, δLx) are judged as not being optimal values. In this case, the values (δLx, δLx, δLx) are adjusted so that the values (ΔX, ΔY, ΔZ) will have acceptable values or less. Specifically, an adjustment correction term is set as (δLx+dx, δLx+dy, δLx+dz), and a correction term represented by (dx, dy, dz) is adjusted so that the values (ΔX, ΔY, ΔZ) will be acceptable values or less to optimize the offset values. This process is performed by the calibration processing unit 123. The calibration process can also be performed to correct the exterior orientation parameters, such as an attitude, of one or both of the laser positioning part 200 and the laser scanner 109.

The TS 100 also includes an interface circuit (not shown) that enables communication with an external device. For example, transmission and reception of data with an external device and operation and movement control of the TS 100 through an external device can be performed.

Example of Processing

Figure 6:
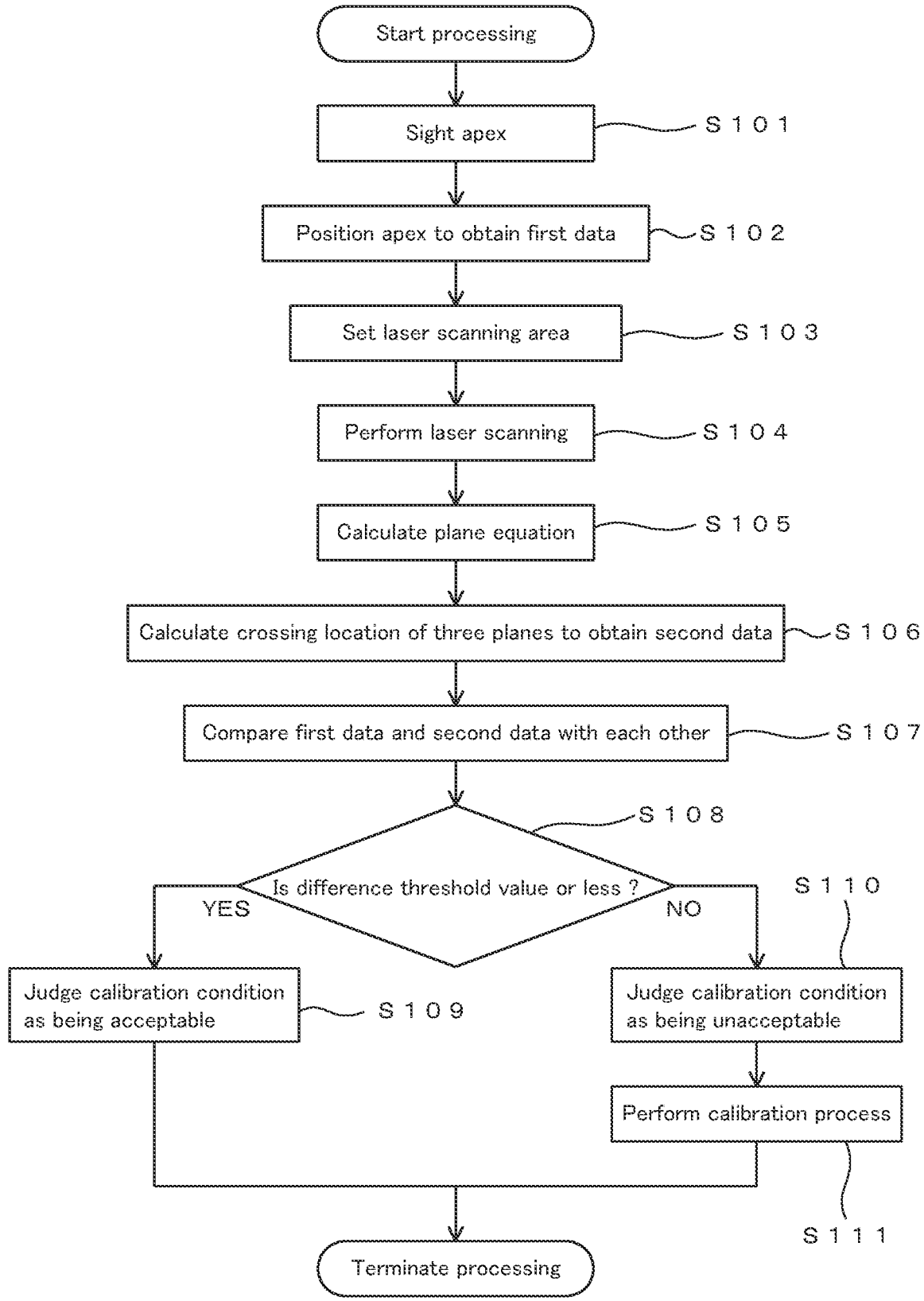
FIG. 6 is a flowchart showing an example of a processing procedure.

An example of processing for checking a calibrated condition between the positioning function and the laser scanner 109 is described. The positioning function is performed by the laser positioning part 200 by using the distance measuring light that is emitted from the distance-measuring-light emitting unit 104 through the telescope 16 to the target. FIG. 6 shows an example of a flowchart for executing the processing. The programs for executing the processing in FIG. 6 are stored in the storage 122 and are executed by the movement controlling unit 121. Alternatively, or additionally, these programs can be stored in an appropriate storage medium and be provided therefrom.

In this embodiment, the calibrated condition between the positioning function of the laser positioning part 200 and the laser scanner 109 is checked by using the cube 300 in FIG. 4.

In this processing, first, the telescope 16 is collimated for the apex 301 (step S101). This working step is performed such that an operator looks into the eyepiece 17 and sights the apex 301 through the telescope 16 by operating the horizontal rotation angle controlling dial 14a and the vertical angle controlling dial 14b.

Next, the apex 301 is positioned by using the distance measuring light from the distance-measuring-light emitting unit 104 (step S102). The resultant positioning data is referred to as first data. Thereafter, the laser scanning area of the laser scanner 109 is set (step S103). In this embodiment, a specific area centered at the apex 301 is set as the scanning area. This laser scanning area is set so as to contain the three planes 311, 312, and 313 in addition to the apex 301.

Then, the laser scanning is performed to the set area by the laser scanner 109 (step S104). The resultant data of the laser scanning obtained in step S104 is used to calculate plane equations of the planes 311, 312, and 313 (step S105). Thereafter, the location of the apex 301 is calculated as the crossing location of the planes 311, 312, and 313, which are calculated in step S105 (step S106). The location of the apex 301 calculated in step S106, at which the planes 311, 312, and 313 cross each other, is referred to as second data.

Then, the first data and the second data are compared with each other (step S107). That is, the positioning data of the apex 301 (first data), which is calculated by the three-dimensional location calculator 108 using the distance measuring light from the distance-measuring-light emitting unit 104 after the apex 301 is sighted, and the positioning data of the apex 301 (second data), which is calculated as the crossing location of planes from the scanning data from the laser scanner 109, are compared with each other.

As a result of the comparison in step S107, whether the difference is a predetermined threshold value or less is determined (step S108). If the difference is the threshold value or less, the calibrated condition is judged as being acceptable, that is, the difference between the location information obtained by the laser positioning part 200 and the location information of the point cloud data obtained by the laser scanner 109 is judged as being in an acceptable range (step S109).

Otherwise, if the difference between the first data and the second data exceeds the predetermined threshold value, the calibrated condition is judged as being unacceptable, that is, the difference between the location information obtained by the laser positioning part 200 and the location information obtained by the laser scanner 109 is judged as being in an unacceptable condition (step S110). In this case, a calibration process for making the difference be in a specified range is performed by the calibration processing unit 123 (step S111).

Modification Example of Processing

The calibrated condition can also be checked by using the rim 320. In this case, the telescope 16 is collimated for each of the points 321, 322, and 323 on the rim 320, and the points 321, 322, and 323 are respectively positioned by using the laser positioning part 200. Then, a straight line equation that fits to the three points is calculated, and the result is obtained as first data.

Meanwhile, the planes 312 and 323 containing the rim 320 are subjected to the laser scanning performed by the laser scanner 109, and plane equations of the planes 312 and 313 are calculated. The linear location at which the plane equations of the planes 312 and 313 cross each other is calculated as location data of the rim 320. This location data is referred to as the second data. The first data and second data obtained are compared, and the difference therebetween is evaluated. The subsequent processes are the same as those in the processing in FIG. 6.

Advantages

The calibrated condition between the positioning function of the TS, which is combined with the laser scanner, and the laser scanning function can be checked without using a dedicated apparatus. For example, the calibrated condition can be checked in a surveying site.

2. Second Embodiment

The method of positioning an apex of a three-dimensional structure by collimating the telescope 16 may involve positioning of multiple points around the apex to determine the location of the apex on the basis of the locations of the multiple points. This method has the same basic principle as the method of calculating the location of an apex of a three-dimensional structure on the basis of the laser scanning data obtained by the laser scanner 109.

The following describes this method by exemplifying the case in FIG. 4. In this case, the telescope 16 is collimated for each of multiple points around the apex 301, and the multiple sighted points are respectively positioned by using the laser positioning part 200.

Specifically, the telescope 16 is collimated for each of three or more points in each of the planes 311, 312, and 313 around the apex 301, and these points are respectively positioned by using the laser positioning part 200.

Thereafter, a plane equation that fits to the three or more positioned points in each of the planes 311, 312, and 313 is calculated. The calculated plane equations respectively correspond to the planes 311, 312, and 313.

After three plane equations respectively corresponding to the planes 311, 312, and 313 are obtained, a crossing point of the three planes represented by the three plane equations is calculated. The location information of the crossing point is obtained as first data, which is location data of the apex 301 that is identified by means of the laser positioning using the distance measuring light from the distance-measuring-light emitting unit 104 after sighted by the telescope 16. The calculation of the three planes and of the crossing location of the three planes and the obtaining of the crossing location are performed by the edge coordinate obtaining unit 111.

The second data is a calculated value of the location of the apex 301 based on the laser scanning data obtained by the laser scanner 109, and details relating to the second data in this embodiment are the same as those in the first embodiment.

3. Third Embodiment

The method of positioning a rim or side of a three-dimensional structure by collimating the telescope 16 may involve positioning of multiple points around the rim to obtain the location of the rim on the basis of the locations of the multiple points. This method has the same basic principle as the method of calculating the location of a rim of a three-dimensional structure on the basis of the laser scanning data obtained by the laser scanner 109.

The following describes this method by exemplifying the case in FIG. 5. In this case, the telescope 16 is collimated for each of multiple points around the rim 320, and the multiple sighted points are respectively positioned by using the laser positioning part 200.

Specifically, the telescope 16 is collimated for each of three or more points in each of the planes 312 and 313 adjacent to each other with the rim 320 therebetween, and these points are respectively positioned by using the laser positioning part 200.

Thereafter, a plane equation that fits to the three or more positioned points in each of the planes 312 and 313 is calculated. The calculated plane equations respectively correspond to the planes 312 and 313.

After two plane equations respectively corresponding to the planes 312 and 313 are obtained, a crossing point of the two planes represented by the two plane equations is calculated. The location information of the crossing point is obtained as first data, which is location data of the rim 320 that is identified by means of the laser positioning using the distance measuring light from the distance-measuring-light emitting unit 104 after sighted by the telescope 16. The calculation of the two planes and of the crossing location of the two planes and the obtaining of the crossing location are performed by the edge coordinate obtaining unit 111.

The second data is a calculated value of the location of the rim 320 based on the laser scanning data obtained by the laser scanner 109, and details relating to the second data in this embodiment are the same as those in the first embodiment.

First Modification

The check of the calibrated condition can be performed by using information of both an apex and a rim in the judgement. In addition, the check of the calibrated condition can also be performed by implementing two or more of the first to the third embodiments in combination. In the case of using a rim, the calibrated condition can be judged by using location data of two or more rims.

Second Modification

Figure 7:
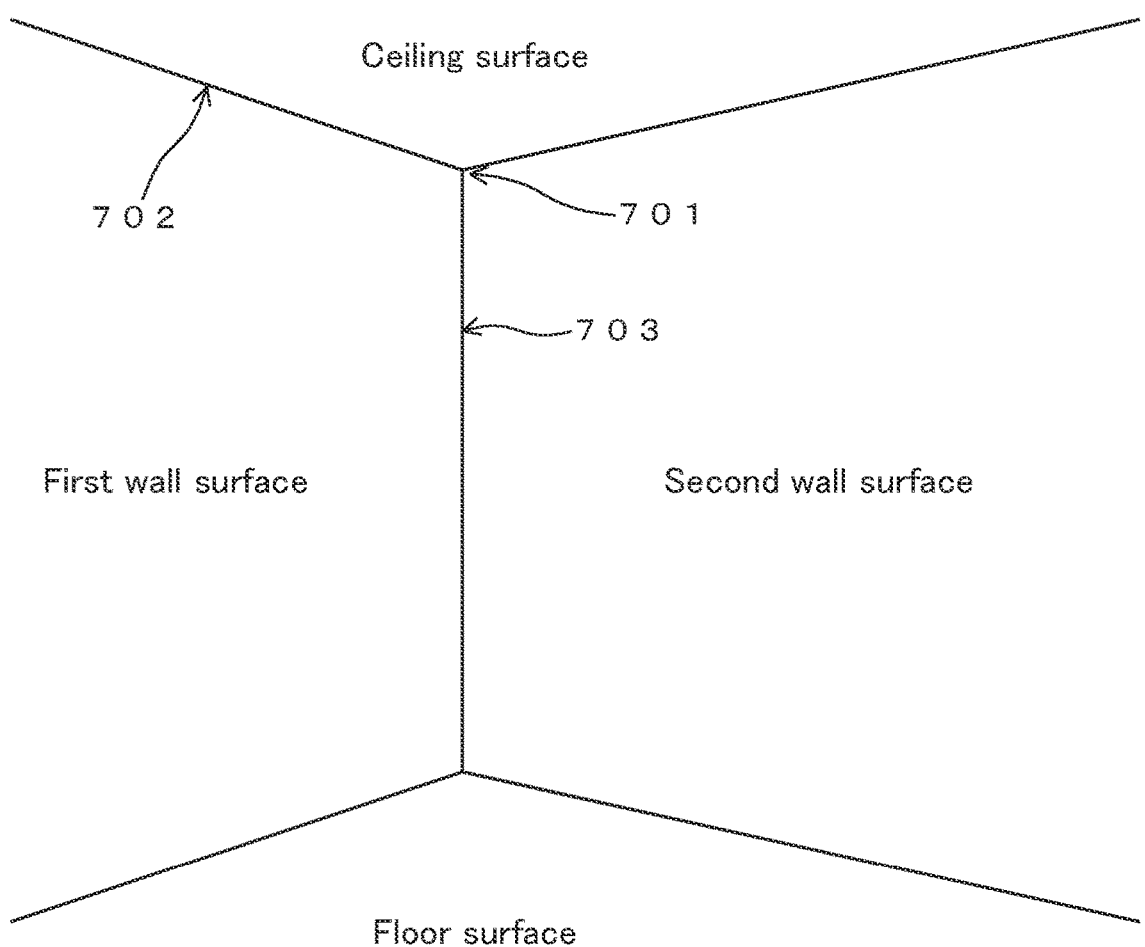
FIG. 7 illustrates an example of a case of performing a calibration-condition checking process using a corner of a room.

A corner inside of a three-dimensional structure can also be used instead of an apex. An example of this case is shown in FIG. 7. FIG. 7 shows an interior of a room with two wall surfaces 1 and 2 and a ceiling surface that cross relative to each other at a corner 701. FIG. 7 also shows a linear part 702 along which the ceiling surface and the wall surface 1 cross each other and shows a linear part 703 along which the wall surfaces 1 and 2 cross each other.

The corner 701 can be used in a similar manner as in the case of using the apex 301 to check the calibrated condition between the positioning function performed by the laser positioning part 200 of the TS 100 and the laser scanner 109. The linear part 702 or 703 can be used in a similar manner as in the case of using the rim 320 to check the calibrated condition between the positioning function performed by the laser positioning part 200 of the TS 100 and the laser scanner 109.

Third Modification

The TS 100 can also be understood as a surveying device that includes: (1) the telescope 16 as a sighting part that sights a target to be positioned, (2) the laser positioning part 200 as a positioning part that positions the sighted object, (3) the laser scanner 109, (4) the edge coordinate obtaining unit 111 as an identifying part that identifies a crossing location of multiple planes constituting a three-dimensional structure on the basis of the result of positioning performed by the laser positioning part 200, (5) the plane crossing location calculator 113 as a calculator that calculates the crossing location of the planes of the three-dimensional structure on the basis of resultant data of laser scanning performed by the laser scanner 109, and (6) the comparing unit 114 as a comparing part that compares the identified crossing location of the multiple planes and the calculated crossing location of the multiple planes with each other.

The present invention can be used in a surveying device having integrated functions of a TS and a laser scanner.

What is claimed is:

1. A surveying device comprising:
an optical system used to sight an object to be positioned;
a laser positioning part that irradiates the object with laser light via the optical system to position the object;
a plane crossing location identifying part that identifies a position of an apex as a crossing location of three or more planes constituting a three-dimensional structure, on a basis of a result of the positioning performed by sighting the apex with the use of the optical system by the laser positioning part;
a laser scanner that performs laser scanning in an area comprising the apex of the three-dimensional structure;
a plane equation calculator that calculates a plane equation of each of the three or more planes on a basis of resultant data of the laser scanning performed by the laser scanner;
a plane crossing location calculator that calculates the crossing location of the three or more planes of the three-dimensional structure, on a basis of the plane equation of each of the three or more planes; and
a comparing part that compares the identified crossing location of the three or more planes and the calculated crossing location of the three or more planes with each other.

2. The surveying device according to claim 1, further comprising a judging part that judges a calibrated condition between the laser positioning part and the laser scanner on a basis of information whether a difference between the identified crossing location of the three or more planes and the calculated crossing location of the three or more planes.

3. A calibration checking method for a surveying device having a laser positioning part combined with a laser scanner, the laser positioning part including an optical system that is used in sighting an object to be positioned, the method comprising:
identifying a position of an apex as a crossing location of three or more planes constituting a three-dimensional structure, on a basis of a result of positioning performed by sighting the apex with the use of the optical system by the laser positioning part;
calculating a plane equation of each of the three or more planes on a basis of resultant data of the laser scanning performed on an area containing the apex by the laser scanner;
calculating the crossing location of the three or more planes of the three-dimensional structure on a basis of the plane equation of each of the three or more planes; and
comparing the identified crossing location of the three or more planes and the calculated crossing location of the three or more planes with each other.

4. The calibration checking method according to claim 3, further comprising:

judging a calibrated condition based on whether a difference between the identified crossing location and the calculated crossing location is within a predetermined threshold range.

5. A non-transitory computer recording medium storing computer executable instructions for checking a calibrated condition between a laser positioning part and a laser scanner, the laser positioning part including an optical system that is used in sighting an object to be positioned, the laser positioning part and the laser scanner being equipped in combination on a surveying device, wherein the computer executable instructions, when executed by a computer processor, cause the computer processor to:

identify a position of an apex as a crossing location of three or more planes constituting a three-dimensional structure, on a basis of a result of positioning performed by sighting the apex with the use of the optical system by the laser positioning part;

calculate a plane equation of each of the three or more planes on a basis of resultant data of the laser scanning performed on an area containing the apex by the laser scanner;

calculate the crossing location of the three or more planes of the three-dimensional structure on a basis of the plane equation of each of the three or more planes; and compare the identified crossing location of the three or more planes and the calculated crossing location of the three or more planes with each other.

6. The non-transitory computer recording medium according to claim 5, wherein the computer executable instructions, when executed by a computer processor, further cause the computer processor to:

judge a calibrated condition based on whether a difference between the identified crossing location and the calculated crossing location is within a predetermined threshold range.

* * * * *